Apr. 3, 1923.
W. D. KELLY.
VEHICLE SPRING.
FILED AUG. 5, 1922.
1,450,378.
2 SHEETS—SHEET 1.
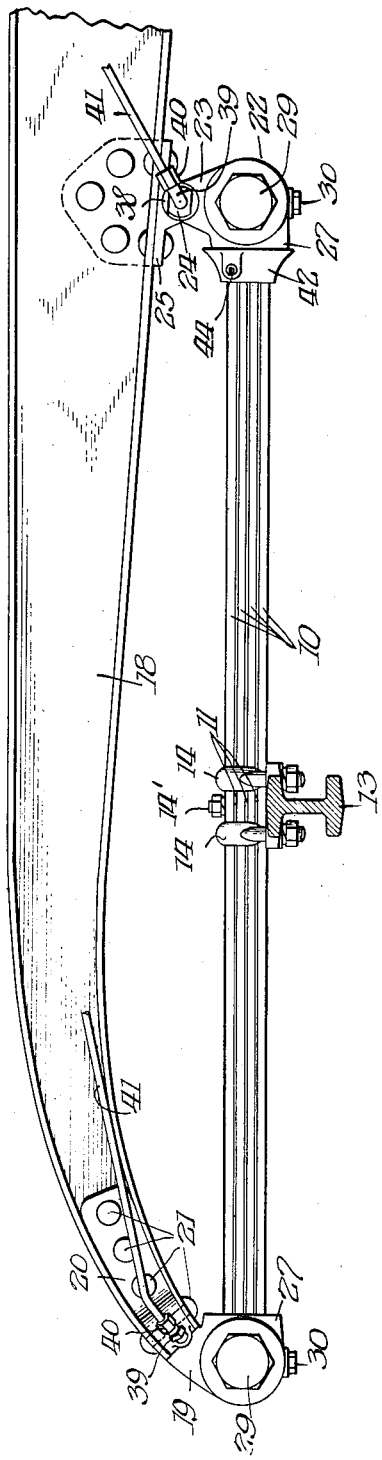
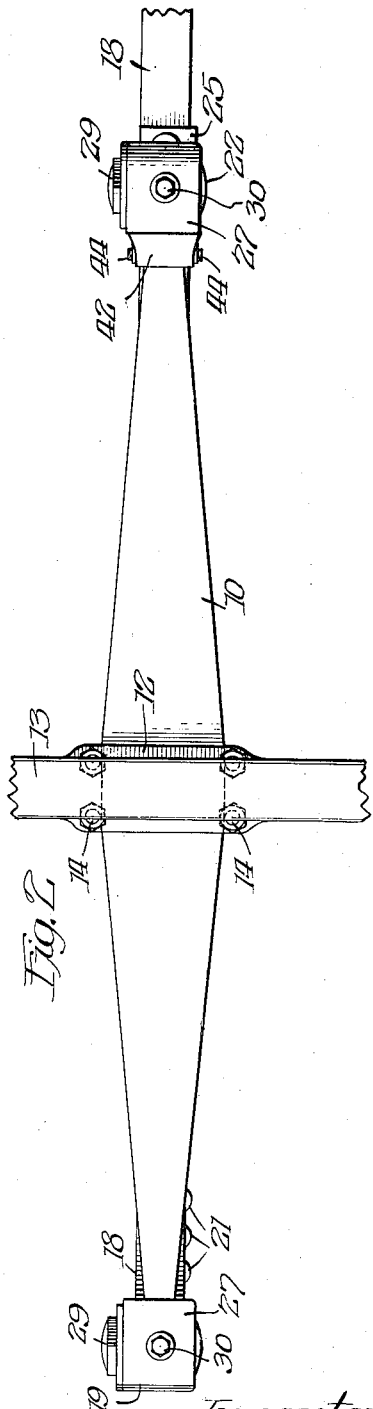
Inventor:
William D. Kelly,
By Fisher, Dowle, Clapp & Soans
Attys.

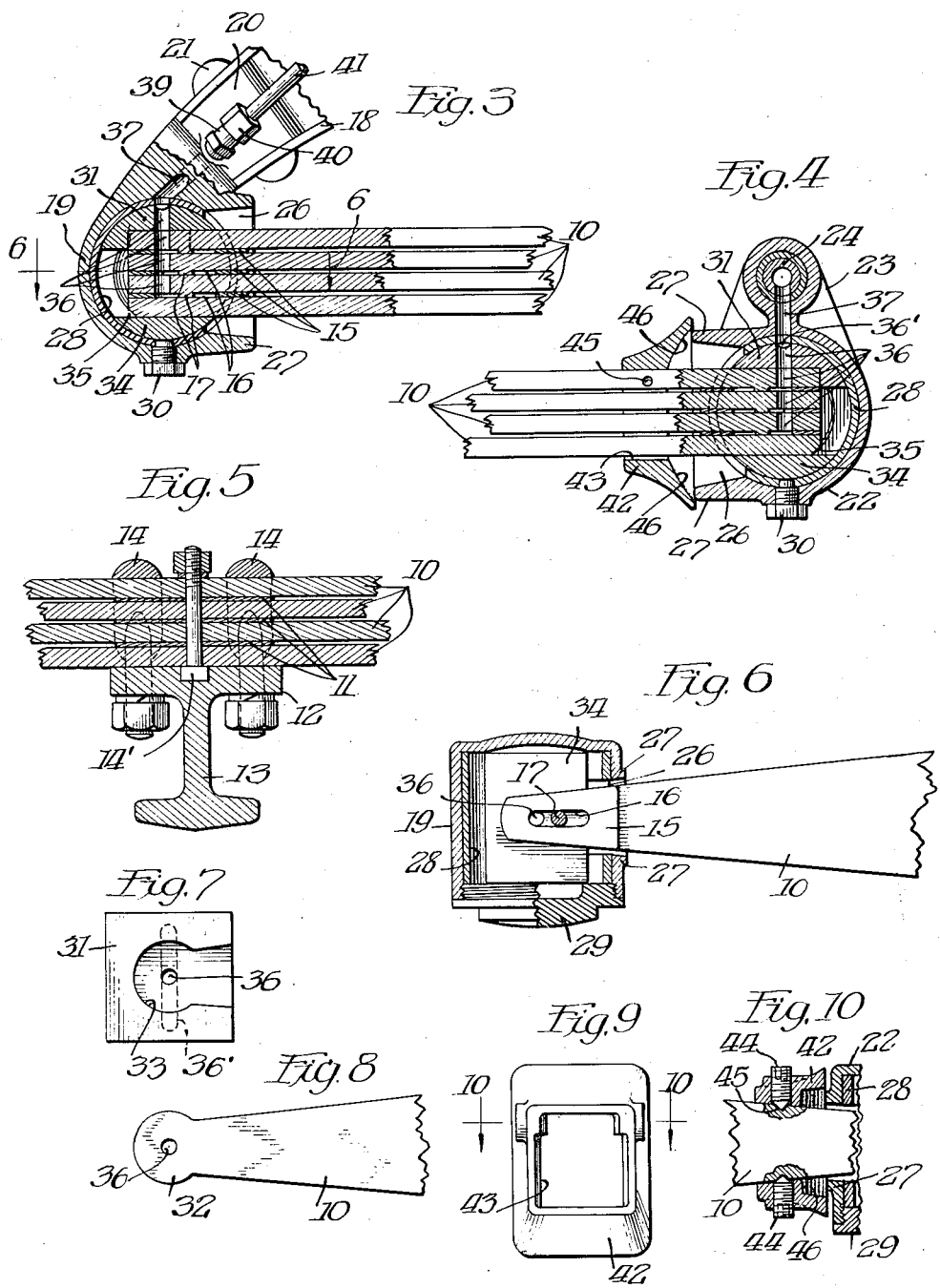

Patented Apr. 3, 1923.

1,450,378

UNITED STATES PATENT OFFICE.

WILLIAM D. KELLY, OF RIVERSIDE, ILLINOIS.

VEHICLE SPRING.

Application filed August 5, 1922. Serial No. 579,848.

*To all whom it may concern:*

Be it known that I, WILLIAM D. KELLY, a citizen of the United States, and a resident of Riverside, county of Cook, and State of Illinois, have invented certain new and useful Improvements in Vehicle Springs, of which the following is a specification.

The invention relates to springs for supporting the frames of automobiles and other vehicles from their axles, and more particularly to automobile springs of the multiple leaf type. The invention seeks to avoid the defects of the automobile springs now in use and provide an improved construction which is cheaper to manufacture, maintains the stresses uniform throughout the length of the spring, avoids excessive rebound and avoids excessive friction between the spring leaves. The invention further seeks to provide improved means for mounting and lubricating multiple leaf automobile springs and for guarding the wearing parts against dust and dirt.

With these and other objects in view, as it will presently appear, the invention consists in the features of improvement hereinafter set forth, illustrated in the preferred form in the accompanying drawings and more particularly pointed out in the appended claims.

While my present improvement may be adapted to different types of springs, it is particularly adapted to an automobile spring of the semi-elliptic type and which type is shown in the drawings.

Fig. 1 is a side view of the improved spring of the semi-elliptic type and shown as applied to the forward end of an automobile frame;

Fig. 2 is an inverted plan view of the same;

Figs. 3 and 4 are central, longitudinal sections through the shackles or brackets at the front and rear end respectively of the spring and by which the spring ends are connected to the automobile or vehicle frame;

Fig. 5 is a central, longitudinal section of the central portion of the improved spring showing the means for clamping it to the axle of the automobile or other vehicle;

Fig. 6 is a detail horizontal section on the line 6—6 of Fig. 3;

Fig. 7 is an inverted plan view of one of the rocking members or journals which serve to pivotally connect the ends of the spring to the spring brackets or shackles;

Fig. 8 is a detail plan view of the free end of the upper main or master leaf of the spring;

Fig. 9 is a view in front elevation of the dust guard for the rear spring bracket; and Fig. 10 illustrates the manner of securing the dust guard to the spring, the guard being shown in section on the line 10—10 of Fig. 9.

The ordinary graduated leaf springs, such as are now commonly used for automobiles and other vehicles, are usually formed of leaves of substantially uniform width throughout but of different lengths and varying degrees of initial curvature to avoid a separation of the leaves upon the reverse bend of the spring. It is also desirable to form the leaves of different thicknesses and to taper the ends of the shorter leaves. For these reasons the springs are difficult and expensive to manufacture and the stresses are not uniformly distributed, so that excessive rebound of the automobile body is apt to occur. For this reason and also because it is difficult to avoid rusting and excessive friction between the spring leaves, breakage is a frequent occurrence and lubrication of the present type of spring is inconvenient and unsatisfactory.

The present improved spring seeks to obviate the objections above noted and comprises a plurality of leaves each of which extends substantially the full length of the spring and is so shaped that the stresses are uniformly distributed throughout the length of the spring. To this end, the spring leaves 10, as shown most clearly in Fig. 2, are rhomboidal or diamond-shaped in plan, being widest at their central portions or at the point at which they are clamped together and secured to one of the members of the vehicle, usually its axle, and tapering toward their free ends and at which points they are connected by suitable brackets or shackles to the other vehicle member, usually its frame. The central portions of the leaves which are clamped together and to the axle are preferably rectangular in outline and the free ends which engage the shackles are truncated so that the ends of the tapered leaves have sufficient width to properly withstand the shearing stresses. Preferably the widths of the central and end portions of the leaves are substantially in the ratio of four to one.

The leaves are not only of substantially the same length but preferably have the same initial curvature, which is the arc of a circle. It should be understood that the spring is shown in Fig. 1 in its "underload" position. In its "no-load" or neutral position the leaves would of course assume the curvature which is originally imparted to them. Preferably also each spring leaf is of substantially uniform thickness throughout the greater portion of its length and the thickness of all the leaves is also preferably the same, in order that the cost of manufacture may be reduced to a minimum.

To avoid excessive friction, the spring leaves are preferably spaced apart throughout the greater portion of their length. To this end, thin shims or separating plates 11 (see Fig. 5) are interposed between the central portions of the spring leaves, being held in position and clamped together and to the spring seat 12 of the axle 13 by U-bolts 14. To prevent the relative longitudinal movement of the central portions of the spring leaves and the separating plates 11 a bolt 14' extends centrally therethrough and the head of this bolt is arranged within a recess in the spring seat 12.

The free ends of the leaves must of course shift relatively to a slight extent in a longitudinal direction as the spring deflects, but they are maintained in load-supporting relation and preferably in sliding contact at their ends through the medium of a series of thin plates 15, each of these plates being rigid with one of the leaves between which it is disposed and in sliding contact with the other. Preferably each plate is rigid with the leaf below it and may be either spot-welded thereto or formed integral therewith. The latter course may be adopted if desired since the spring leaves may be swaged to shape from a hot billet in a bulldozing machine, and when so constructed the ends of the leaves can be readily made slightly thicker than the remaining portions thereof. Preferably however the leaves are formed by rolling each leaf to a uniform thickness throughout its length and the contacting and separating plates 15 are formed of separate sheet steel punchings each of which is spot-welded to the end of the spring beneath it. Preferably also in the punching operation each separator plate is provided with a longitudinal slot 17 which is arranged to engage a short lug or pin formed upon or fixed to the leaf immediately above. This arrangement does not, of course, interfere with the relative sliding movement of the ends of the spring leaves but holds them against relative transverse movement so that all of the leaves assist in taking the side or lateral thrust upon the spring.

The ends of the spring are connected to the frame member 18 of the automobile or vehicle by front and rear supporting brackets or shackles, each of which, in the preferred embodiment of the invention, is chambered, being open at one side only and adapted to enclose the free ends of the spring leaves. The front bracket 19 is fixed in any usual or suitable manner to the frame member 18. In the form shown it is provided with an integral arm 20 which fits between the flanges of the frame member and is secured thereto by rivets 21. The rear bracket 22 has an off-set portion 23 on its upper side provided with a transverse opening for receiving a pivot bolt 24 by which it is connected to a bracket 25 riveted to the frame member.

Each of the brackets is provided with a bore or chamber which is preferably cylindrical and is of sufficient size to receive and completely enclose the free ends of the spring which project into the chamber through an opening 26 in its side wall and which opening is surrounded by a flange 27 integral with the bracket. A cylindrical bushing 28, preferably formed of steel tubing, fits within the bore of each bracket, is cut away opposite the bracket opening 26 and is held in position within the bracket by a cap plate 29 threaded into one end of the bracket and having a wrench-engaging projection thereon. Preferably, also, each bushing is held against rotary movement by a set-screw 30 threaded through the lower portion of the bracket and having a reduced end engaging an opening in the bushing. The bushings provide bearing surfaces for oscillating or rocking journal members which are arranged within the brackets and engage the ends of the springs so that the latter are free to rock relatively to the brackets as the spring deflects.

In the preferred embodiment of the invention the rocking members are in the form of segmental journals 31 arranged within the upper portions of the bushing 28 and against which the ends of the upper spring leaf bear in load supporting relation and so that the journal segments oscillate with the ends of the spring as the latter is deflected. Preferably the upper spring leaf is interlocked with the journal segments 31 so that it will resist lateral and longitudinal thrusts upon the spring and act not only as a resilient support for the vehicle spring but also as a radius rod. The interlocking of the upper or main spring leaf with the journal segment of the pivoted rear bracket 22 also, of course serves to hold this bracket in proper operative relation with the spring.

For this purpose, the flat ends of the upper or main spring leaf are enlarged to form circular portions or heads 32 (see Fig. 8) and the lower faces of the journal segments 31 are provided with correspondingly shaped recesses 33 (see Fig. 7) so as to receive and interlock with the ends of the upper springs. Key segments 34 are arranged within the bushings 28 beneath the ends of the lower spring leaf and, like the journal segments 31, are held in position and against end-play between the closed inner ends of the bracket chambers and the cap plates 29.

The key segments lock the spring ends and journal segments in position in the brackets, but the journal and key segments and the ends of the springs are all free to turn about the axes of the bushings as the spring is deflected. The ends of the upper main or master leaf are of course held against longitudinal movement relative to the journal segments and brackets, but the ends of the other or auxiliary leaves while they are constantly maintained in load-supporting relation with the main or master leaf, journal segments and brackets, are free to move relatively thereto in longitudinal direction to a slight extent as the spring deflects. To afford additional clearance for the longitudinal movement of the bottom leaf its ends are preferably beveled as indicated at 35. The parts are so constructed that in normal "under-load" position there is a slight clearance between the key segments and the lower faces of the bottom leaf.

The ends of all of the leaves, except the bottom one, and the journal segments 31 are provided with channels or openings 36 and the upper surfaces of the channels have grooves 36', the channels and grooves communicating with one another and with passages 37 formed in the supporting brackets and through which lubricant can be fed or forced to the bearing surfaces of the bushings and journal segments and the surfaces of the ends of the spring leaves which are in sliding contact. The lubricant passage of the rear bracket 22 communicates with the hollow bore of the pivot bolt 24 that is held against rotation by a lug 38 on the bracket 25. The front bracket and the head of the bolt 24, in the arrangement shown, are provided with nipples 39 and couplings 40 so that the lubricating passages of the brackets, journal segments and spring ends can be connected by pipes 41 to the motor or chassis lubricating system.

To prevent the entrance of dust and dirt into the chamber of the rear bracket, a guard 42, preferably formed of metal, is mounted upon the rear end of the spring closely adjacent the flange 27 of the bracket. As shown, the guard 42 is provided with an opening 43 through which the spring leaves extend, the upper portion of the opening being slightly narrower than the lower portion so that the guard fits the upper spring leaf and a slight clearance is afforded between the guard and the edges of the other leaves. Set screws 44 threaded through the sides of the guard engage punch marks 45 formed in the edges of the upper leaf and hold the guard in position. The surfaces 46 of the guard adjacent the edges of the bracket flanges 27 is cylindrical and concentric with the journal axis of the bracket, so that they may be maintained closely adacent the edges of the flanges as the spring deflects and thus prevent the entrance of dust and dirt to the bracket chamber. While it is not thought it would be required, a similar guard may be provided for the front bracket.

In the improved spring, "nip" or varying degrees of initial curvature of the spring leaves is eliminated. Each leaf is of the same length and has the same initial curve and the stress are uniform throughout the length of the spring. With this arrangement the rebound action of the spring is maintained at the lowest possible minimum and all of the leaves act to check the rebound as soon as the spring passes its neutral point, whereas in a graduated leaf spring there is no rebound checking effect until the spring passes considerably beyond its neutral point, since each leaf has a different neutral point due to the "nip" or varying degrees of initial curvature. For these reasons, with the improved spring, the rebound and breakage due to excessive reverse bend are reduced to the lowest possible minimum. Rusting of the contacting surfaces of the spring leaves is also avoided since in the preferred embodiment of the invention the leaves are in sliding contact at their ends only and these end portions are enclosed within the brackets or shackles and are thereby protected from dust and dirt, and also may be conveniently and thoroughly lubricated. As the spring leaves are of uniform length and have the same degree of initial curvature in the arc of a circle, and since the leaves are otherwise substantially uniform, the improved spring can be economically manufactured.

It should also be noted that while the superposed tapered leaves are all of the same length, they have flat, straight free ends in sliding engagement and compactly arranged within the supporting brackets, so that the latter need not be of excessive size. At the same time, relatively large bearing and supporting surfaces are provided in the brackets. It is also noted that each journal segment and the adjacent free ends of the leaves all turn together relatively to the bracket about a single axis as the spring deflects and that this axis is substantially in line with the central longitudinal axis of the spring, so that the extent of relative movement of the bearing surfaces is reduced to a minimum. Also with this arrangement there is no bending strain on the spring due to end thrust.

Obviously, changes may be made in the details set forth without departure from the essentials of the invention as defined in the claims. Thus, if the axle and frame are connected not only by springs but also by radius rods, the forward end of the upper main or master leaf of the spring can be in sliding engagement with the journal segment in the front bracket and need not be interlocked with it. It should however, be interlocked with the journal segment of the rear pivoted bracket to hold the latter in proper operative relation with the spring. In the preferred embodiment, as described, the upper master leaf is interlocked with the journal segments of both brackets and thus dispenses with the necessity of employing additional radius rods.

I claim as my invention:—

1. A laminated vehicle spring comprising a plurality of superposed tapered leaves of substantially the same length, spacers between the relatively movable free ends of the leaves, each spacer being rigid with one of the adjacent leaves and in sliding contact with the other, a supporting bracket, and an oscillating member journalled in said bracket and with which the free ends of said leaves are maintained in load-supporting relation with the free end of one leaf in fixed relation thereto.

2. In combination with vehicle frame and axle members, of a laminated spring comprising a tapered main leaf and one or more tapered auxiliary leaves of substantially the same length as said main leaf, portions of said leaves being clamped together and to one of said vehicle members, a supporting bracket connected to the other of said members, and a journal mounted to oscillate in said bracket, the narrow, relatively movable free ends of the leaves being in sliding contact and in load-supporting relation with said journal and arranged to turn together with the journal about a single axis as the spring deflects, and said journal being maintained in fixed relation with said main leaf to resist relative horizontal movement between said vehicle members.

3. A laminated vehicle spring comprising a plurality of tapered superposed leaves of substantially the same length, separators for maintaining said leaves spaced apart throughout the greater portion of their length, each of the separators between the relatively movable free ends of the leaves being fixed to one of the adjacent leaves and in sliding contact with the other, a supporting bracket, and an oscillating journal mounted in said bracket and maintained in fixed relation with the free end of one of said leaves to resist longitudinal thrusts on the spring, said journal and the ends of all of the leaves being arranged to turn relatively to the bracket about a single axis as the spring deflects.

4. A laminated vehicle spring comprising a plurality of superposed tapered leaves of substantially uniform length, spaced apart throughout the greater portion of their length and having their narrow free ends in sliding contact, a hollow supporting bracket for enclosing the free ends of said leaves, and an oscillating member journalled in said bracket and detachably interlocked and maintained in fixed relation with the free end of one of said leaves to turn therewith as the spring deflects, the ends of the other leaves being free to move in longitudinal direction relatively to one another and to said journal member.

5. A laminated vehicle spring of substantially uniform thickness throughout its length and comprising a plurality of tapered leaves of substantially uniform length, held against relative longitudinal movement at their larger portions and in sliding contact at their free ends, a chambered bracket within which the free ends of said leaves extend, and a segmental journal mounted within said bracket and with which said leaves are maintained in load-supporting relation, the relatively movable free ends of the leaves and said journal being arranged to turn relatively to the bracket about a single axis as the spring deflects.

6. A vehicle spring comprising a plurality of superposed leaves of substantially uniform length and in sliding contact at their free ends, a bracket enclosing the free ends of said leaves, and an oscillating journal segment mounted in said bracket and extending across and interlocked in fixed relation with the free end of the upper leaf.

7. A vehicle spring comprising a plurality of superposed leaves of substantially uniform length and in sliding contact at their free ends, a bracket enclosing the free ends of said leaves, and an oscillating segment mounted in said bracket and with which the ends of the springs are maintained in load-supporting relation, said bracket having a passage for lubricant and said journal segment and the ends of said leaves except that of the lower leaf having channels communicating with said passage.

8. A vehicle spring comprising a plurality of tapered leaves of substantially uniform length, the larger portions of said leaves being clamped together, separators between the clamped portions and between the free ends of said leaves, each of the separators at the free ends being rigid with one of the adjacent leaves and in sliding contact with the other, and a shackle in which the free ends of said leaves are mounted to turn and slide relatively to one another as the spring deflects.

9. A vehicle spring comprising a plurality of tapered leaves of substantially uniform length, the larger portions of said leaves being clamped together, a chambered supporting bracket within which the free ends of said leaves are enclosed, journal and key segments mounted in said bracket and arranged respective above and below the ends of the leaves, the free end of the upper leaf being interlocked with said journal segment, said bracket having a cap-plate for holding said segments in position and said bracket, journal segment and the contacting ends of the springs having communicating passages for conducting lubricant to the wearing surfaces thereof.

10. A vehicle spring comprising a plurality of tapered leaves of substantially uniform length, the larger portions of said leaves being clamped together, separators between the clamped portions and between the free ends of said leaves, for holding the same in parallel spaced relation, pin and slot connections between the ends of said leaves for preventing relative lateral movement but permitting the relative longitudinal movement thereof as the spring deflects, a supporting bracket enclosing the free ends of the leaves, and an oscillating journal member mounted on said bracket and fixed to the end of one of the outer leaves.

11. A vehicle spring comprising a plurality of tapered leaves of substantially uniform length clamped together at their larger portions, a supporting bracket within which the free ends of said leaves extend and an oscillating journal member connected to the free end of one of the outer leaves and having an external cylindrical bearing surface engaging an internal cylindrical bearing surface of said bracket, the axis of said bearing surface being disposed between the upper and lower surfaces of the end of the spring.

12. A vehicle spring comprising a plurality of tapered leaves of substantially uniform length clamped together at their larger portions, a chambered supporting bracket open at one side only to receive the free ends of said leaves, the latter being free to turn in said bracket and move relatively to one another as the spring deflects, and a dust guard mounted on said leaves adjacent said bracket and extending over the opening thereof.

13. A vehicle spring comprising a plurality of superposed spaced leaves in sliding contact at their free ends only, a chambered bracket open at one side only to receive and enclose the free ends of the leaves, a pivotal connection between the leaves and bracket arranged within the latter, and a dust guard mounted on the leaves having a cylindrical face adjacent said bracket and concentric with said pivotal connection, the bracket and parts therein having passages for conducting lubricant to their wearing surfaces.

14. The combination with a vehicle frame and axle, of a plurality of superposed leaves of substantially uniform length, tapering from their centres to their end and centrally clamped together and to said axle, front and rear brackets fixed and pivotally connected respectively to the vehicle frame and enclosing the ends of said leaves, and oscillating journal members mounted within said brackets and maintained in fixed relation with the free ends of one of said leaves.

15. The combination with a vehicle frame and axle, of a plurality of superposed leaves of substantially uniform length, tapering from their centres to their ends and centrally clamped together and to said axle, separator plates between the central and free end portions of said leaves for holding the same in spaced relation, front and rear chambered brackets fixed and pivotally connected respectively to the vehicle frame, and enclosing the ends of said leaves, and oscillating journal segments mounted within said brackets and interlocked with the ends of the upper leaf.

16. A vehicle spring comprising a plurality of superposed, tapered leaves of substantially uniform length, clamped together at their larger portions and in sliding contact at their free ends, a supporting bracket chambered to enclose the free ends of said leaves and having an internal, cylindrical bearing surface and a segmental journal fitting between the end of one of the outer leaves and said cylindrical bearing surface, said journal being free to turn with the leaves as the spring deflects and the bracket and parts therein having communicating passages for conducting lubricant to their wearing surfaces.

17. The combination with a vehicle frame and axle, of a plurality of tapered, superposed spring leaves of substantially uniform length and curvature clamped together at their larger portions and to said axle and having their free ends in sliding contact, a supporting bracket mounted on the vehicle frame and chambered to enclose the free end portions of said leaves, said bracket having an internal cylindrical bearing surface and a journal segment arranged within the chamber of said bracket and fitting the upper face of the end portion of the upper leaf and the cylindrical bearing surface of t' bracket, the bracket, journal segment an the free ends of the springs having communicating passages for conducting lubricant to the wearing surfaces thereof.

18. A laminated vehicle spring comprising a plurality of tapered leaves of substantially uniform length, held against relative longitudinal movement at their larger portions and having relatively movable free ends in sliding contact, a supporting bracket having a cylindrical chamber open at its outer end and having an opening in its side through which the free ends of the leaves extend, separate journal and key segments adapted to be inserted through the open outer end of said chamber and arranged therein above and below the ends of said leaves, the free end of one of the outer leaves being interlocked in fixed relation with said journal segment and a cap plate closing the open outer end of the bracket chamber.

19. A laminated vehicle spring of substantially uniform thickness throughout its length and comprising a plurality of tapered leaves of substantially uniform length, held against relative longitudinal movement at their larger portions and in sliding contact at their relatively movable, narrow free ends, a chambered supporting bracket within which the free ends of the leaves are enclosed, and a member journalled and enclosed within said bracket and with which said leaves are maintained in load-supporting relation, one leaf, constituting a main leaf, being interlocked in fixed relation with said journal member, and the latter and the free ends of the leaves being all arranged to turn relatively to said bracket about a single transverse axis closely adjacent the central longitudinal axis of the main leaf as the spring is deflected.

20. In combination with a vehicle spring having a substantially straight flat end, a hollow supporting bracket having an opening in its side for receiving the end of said spring, a member journalled and enclosed within said bracket, said journal member having an external bearing surface fitting a corresponding internal bearing surface of said bracket and means for maintaining the end of said spring detachably interlocked in fixed relation with said journal member to turn together about the axis of the journal member as the spring deflects and to resist longitudinal thrusts on the spring.

21. A laminated vehicle spring comprising a plurality of tapered leaves of substantially uniform length, held against relative longitudinal movement at their larger portions and having their relatively movable, narrow free ends in sliding contact, a chambered shackle adapted to enclose the free ends of said leaves, an oscillating journal segment mounted in the chamber of said shackle and extending across and interlocked in fixed relation with the free end of one of the outer leaves and a supporting pivot pin for said shackle, said pin, shackle, journal segment and the ends of said leaves having channels for conducting lubricant to the bearing surfaces thereof.

22. A laminated vehicle spring comprising a plurality of tapered leaves of substantially uniform length and having their narrow free ends in sliding contact, a chambered supporting bracket enclosing the free ends of the leaves, and a member journalled and enclosed within said bracket and fixed to the free end of one of said leaves to resist longitudinal thrusts on the spring, said member and free ends of the leaves being arranged to turn relatively to the bracket about a single transverse axis as the spring deflects.

WILLIAM D. KELLY.